US012598440B2

(12) United States Patent
Falk et al.

(10) Patent No.: US 12,598,440 B2
(45) Date of Patent: Apr. 7, 2026

(54) RENDERING OF OCCLUDED AUDIO ELEMENTS

(71) Applicant: Telefonaktiebolaget LM Ericsson (publ), Stockholm (SE)

(72) Inventors: Tommy Falk, Spånga (SE); Werner De Bruijn, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 224 days.

(21) Appl. No.: 18/286,841

(22) PCT Filed: Apr. 12, 2022

(86) PCT No.: PCT/EP2022/059762
§ 371 (c)(1),
(2) Date: Oct. 13, 2023

(87) PCT Pub. No.: WO2022/218986
PCT Pub. Date: Oct. 20, 2022

(65) Prior Publication Data

US 2024/0388863 A1 Nov. 21, 2024

Related U.S. Application Data

(60) Provisional application No. 63/174,727, filed on Apr. 14, 2021.

(51) Int. Cl.
*H04S 7/00* (2006.01)

(52) U.S. Cl.
CPC .................................... *H04S 7/30* (2013.01)

(58) Field of Classification Search
CPC ............ H04S 2420/01; H04S 2400/01; H04S 2400/11
(Continued)

(56) References Cited

U.S. PATENT DOCUMENTS 11,070,933 B1 * 7/2021 Schroeder ................ H04R 5/04
11,335,008 B2 * 5/2022 Chakraborty ........... G06T 19/20
(Continued)

FOREIGN PATENT DOCUMENTS

EP 0 966 179 A2 12/1999
JP 2007-236833 A 9/2007
(Continued)

OTHER PUBLICATIONS

International Search Report and Written Opinion with Transmittal dated Aug. 24, 2022 issued in International Patent Application No. PCT/EP2022/059762 (58 pages).
(Continued)

*Primary Examiner* — Alexander Krzystan
(74) *Attorney, Agent, or Firm* — Rothwell, Figg, Ernst & Manbeck, P.C.

(57) ABSTRACT

A method for rendering an audio element that is at least partially occluded, where the audio element is represented using a set of two or more virtual loudspeakers (e.g., SpL, SpC, SpR), the set comprising a first virtual loudspeaker (e.g., SpR). In one embodiment, the method includes modifying a first virtual loudspeaker signal for the first virtual loudspeaker (e.g., SpR), thereby producing a first modified virtual loudspeaker signal. The method also includes using the first modified virtual loudspeaker signal to render the audio element (e.g., generate an output signal using the first modified virtual loudspeaker signal).

17 Claims, 15 Drawing Sheets

(58) Field of Classification Search
USPC .................................................. 381/306, 310
See application file for complete search history.

(56) References Cited

U.S. PATENT DOCUMENTS

| | | | | |
|---|---|---|---|---|
| 2009/0137314 | A1 | 5/2009 | Nakayama | |
| 2009/0150163 | A1 | 6/2009 | Martin | |
| 2016/0150345 | A1 | 5/2016 | Jang | |
| 2018/0012630 | A1* | 1/2018 | Thomée | G06V 10/40 |
| 2020/0296533 | A1 | 9/2020 | Thall et al. | |
| 2021/0342996 | A1* | 11/2021 | Saleh | G06F 9/5027 |
| 2022/0109809 | A1* | 4/2022 | Wassvik | H04N 7/15 |
| 2023/0196655 | A1* | 6/2023 | Tytgat | G06T 15/20 345/427 |

FOREIGN PATENT DOCUMENTS

| | | | |
|---|---|---|---|
| JP | 2018-524927 | A | 8/2018 |
| WO | 2017/007667 | A1 | 1/2017 |
| WO | 2019/066348 | A1 | 4/2019 |

OTHER PUBLICATIONS

ISO/IEC JTC 1/SC 29, Oct. 12, 2016, ISO/IEC 23008-3:201x(E), ISO/IEC JTC 1/SC 29/WG 11, Secretariat: JISC, "Information technology—High efficiency coding and media delivery in heterogeneous environments—Part 3: 3D audio" (23 pages).

BTF Renderer Group, EBU Operating Eurovision and Euroradio, Tech 3388, "ADM Renderer for Use in Next Generation Audio Broadcasting", Specification Version 1.0, Geneva, Mar. 2018 (57 pages).

Schissler, C. et al., "Efficient HRTF-based Spatial Audio for Area and Volumetric Sources", IEEE Transactions on Visualization and Computer Graphics, vol. 22, No. 4, Apr. 2016 (11 pages).

* cited by examiner

RENDERING OF OCCLUDED AUDIO ELEMENTS

CROSS REFERENCE TO RELATED APPLICATIONS

This application is a 35 U.S.C. § 371 National Stage of International Patent Application No. PCT/EP2022/059762, filed 2022 Apr. 12, which claims priority to U.S. Provisional Patent Application No. 63/174,727, filed 2021 Apr. 14, which is incorporated by this reference.

TECHNICAL FIELD

Disclosed are embodiments related to rendering of occluded audio elements.

BACKGROUND

Spatial audio rendering is a process used for presenting audio within an extended reality (XR) scene (e.g., a virtual reality (VR), augmented reality (AR), or mixed reality (MR) scene) in order to give a listener the impression that sound is coming from physical sources within the scene at a certain position and having a certain size and shape (i.e., extent). The presentation can be made through headphone speakers or other speakers. If the presentation is made via headphone speakers, the processing used is called binaural rendering and uses spatial cues of human spatial hearing that make it possible to determine from which direction sounds are coming. The cues involve inter-aural time delay (ITD), inter-aural level difference (ILD), and/or spectral difference.

The most common form of spatial audio rendering is based on the concept of point-sources, where each sound source is defined to emanate sound from one specific point. Because each sound source is defined to emanate sound from one specific point, the sound source doesn't have any size or shape. In order to render a sound source having an extent (size and shape), different methods have been developed.

One such known method is to create multiple copies of a mono audio element at positions around the audio element. This arrangement creates the perception of a spatially homogeneous object with a certain size. This concept is used, for example, in the "object spread" and "object divergence" features of the MPEG-H 3D Audio standard (see references [1] and [2]), and in the "object divergence" feature of the EBU Audio Definition Model (ADM) standard (see reference [4]). This idea using a mono audio source has been developed further as described in reference [7], where the area-volumetric geometry of a sound object is projected onto a sphere around the listener and the sound is rendered to the listener using a pair of head-related (HR) filters that is evaluated as the integral of all HR filters covering the geometric projection of the object on the sphere. For a spherical volumetric source this integral has an analytical solution. For an arbitrary area-volumetric source geometry, however, the integral is evaluated by sampling the projected source surface on the sphere using what is called a Monte Carlo ray sampling.

Another rendering method renders a spatially diffuse component in addition to a mono audio signal, which creates the perception of a somewhat diffuse object that, in contrast to the original mono audio element, has no distinct pin-point location. This concept is used, for example, in the "object diffuseness" feature of the MPEG-H 3D Audio standard (see reference [3]) and the "object diffuseness" feature of the EBU ADM (see reference [5]).

Combinations of the above two methods are also known. For example, the "object extent" feature of the EBU ADM combines the creation of multiple copies of a mono audio element with the addition of diffuse components (see reference [6]).

In many cases the actual shape of an audio element can be described well enough with a basic shape (e.g., a sphere or a box). But sometimes the actual shape is more complicated and needs to be described in a more detailed form (e.g., a mesh structure or a parametric description format).

In the case of heterogeneous audio elements, as are described in reference [8], the audio element comprises at least two audio channels (i.e., audio signals) to describe a spatial variation over its extent.

In some XR scenes there may be an object that blocks at least part of an audio element in the XR scene. In such a scenario the audio element is said to be at least partially occluded.

That is, occlusion happens when, from the viewpoint of a listener at a given listening position, an audio element is completely or partly hidden behind some object such that no or less direct sound from the occluded part of the audio element reaches the listener. Depending on the material of the occluding object, the occlusion effect might be either complete occlusion (e.g. when the occluding object is a thick wall), or soft occlusion where some of the audio energy from the audio element passes through the occluding object (e.g., when the occluding object is made of thin fabric such as a curtain).

SUMMARY

Certain challenges presently exist. For example, available occlusion rendering techniques deal with point sources where the occurrence of occlusion can be detected easily using raytracing between the listener position and the position of the point source, but for an audio element with an extent, the situation is more complicated since an occluding object may occlude only a part of the extended audio element. Therefore, a more elaborate occlusion detection technique is needed (e.g., one that determines which part of the extended audio element is occluded). For a heterogeneous extended audio element (i.e., an audio element with an extent which has non-homogeneous spatial audio information distributed over its extent (e.g. an extended audio element that is represented by a stereo signal)), the situation is even more complicated because the rendering of a partly occluded object of this type should take into account what would be the expected result of the partly occlusion on the spatial audio information that reaches the listener. A special version of the latter problem appears when a heterogeneous extended audio element is rendered by means of a discrete number of virtual loudspeakers. If using traditional occlusion, operating on individual virtual loudspeakers, and one or more of the virtual loudspeakers are occluded, which, for example, in the case of using two virtual loudspeakers (e.g. a left (L) and right (R) speaker) would mean that basically all spatial information is lost whenever either the L or R virtual loudspeaker is occluded. More generally in the case of extended objects that are rendered using a discrete number of virtual loudspeakers (so also including non-heterogeneous audio elements, e.g. homogeneous or diffuse extended audio elements), there is a problem with the amount of occlusion changing in a step-wise manner when the audio element, the occluding object, and/or listener are moving relative to each other.

Accordingly, in one aspect there is provided a method for rendering an audio element that is at least partially occluded, where the audio element is represented using a set of two or more virtual loudspeakers, the set comprising a first virtual loudspeaker. In one embodiment, the method includes modifying a first virtual loudspeaker signal for the first virtual loudspeaker, thereby producing a first modified virtual loudspeaker signal. The method also includes using the first modified virtual loudspeaker signal to render the audio element (e.g., generate an output signal using the first modified virtual loudspeaker signal). In another embodiment the method includes moving the first virtual loudspeaker from an initial position to a new position. The method also includes generating a first virtual loudspeaker signal for the first virtual loudspeaker based on the new position of the first virtual loudspeaker. The method also includes using the first virtual loudspeaker signal to render the audio element.

In another aspect there is provided a computer program comprising instructions which when executed by processing circuitry of an audio renderer causes the audio renderer to perform either of the above described methods. In one embodiment, there is provided a carrier containing the computer program wherein the carrier is one of an electronic signal, an optical signal, a radio signal, and a computer readable storage medium. In another aspect there is provided a rendering apparatus that is configured to perform either of the above described methods. The rendering apparatus may include memory and processing circuitry coupled to the memory.

An advantage of the embodiments disclosed herein is that the rendering of an audio element that is at least partially occluded is done in a way that preserves the quality of the spatial information of the audio element.

BRIEF DESCRIPTION OF THE DRAWINGS

The accompanying drawings, which are incorporated herein and form part of the specification, illustrate various embodiments.

DETAILED DESCRIPTION

Figure 1:
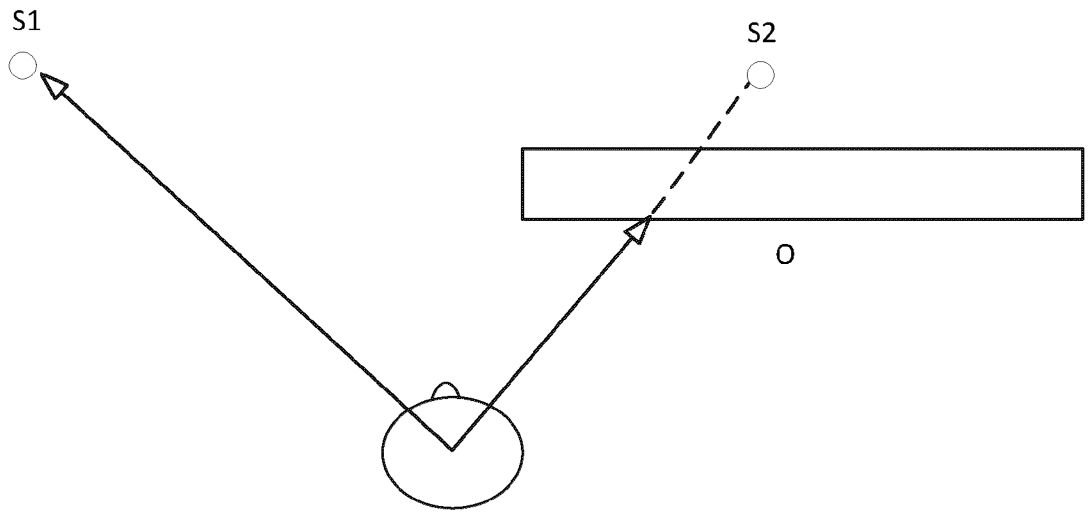
FIG. 1 shows two point sources (S1 and S2) and an occluding object (O).
Figure 2:
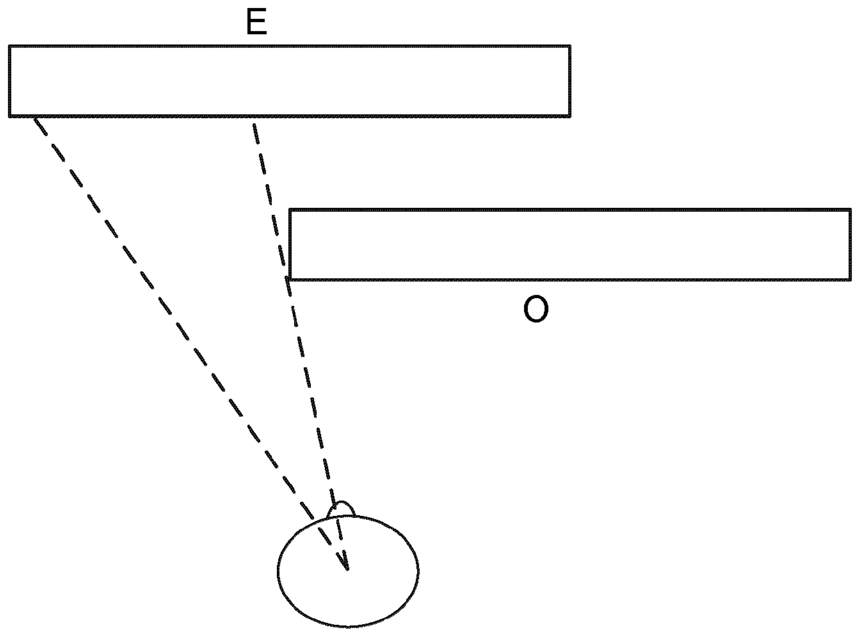
FIG. 2 shows an audio element having an extent being partially occluded by an occluding object (O).

The occurrence of occlusion may be detected using ray-tracing methods where the direct path between the listener position and the position of the audio element is searched for any occluding objects. FIG. 1 shows an example of two point sources (S1 and S2), where one is occluded by an object (O) (which is referred to as the "occluding object") and the other is not. In this case the occluded audio element should be muted in a way that corresponds to the acoustic properties of the material of the occluding object. If the occluding object is a thick wall, the rendering of the direct sounds from the occluded audio element should be more or less completely muted. In the case of an audio element (E) with an extent, as shown in FIG. 2, the audio element (E) may be only partly occluded. This means that the rendering of the audio element needs to be altered in a way that reflects what part of the extent is occluded and what part is not occluded.

Figure 3:
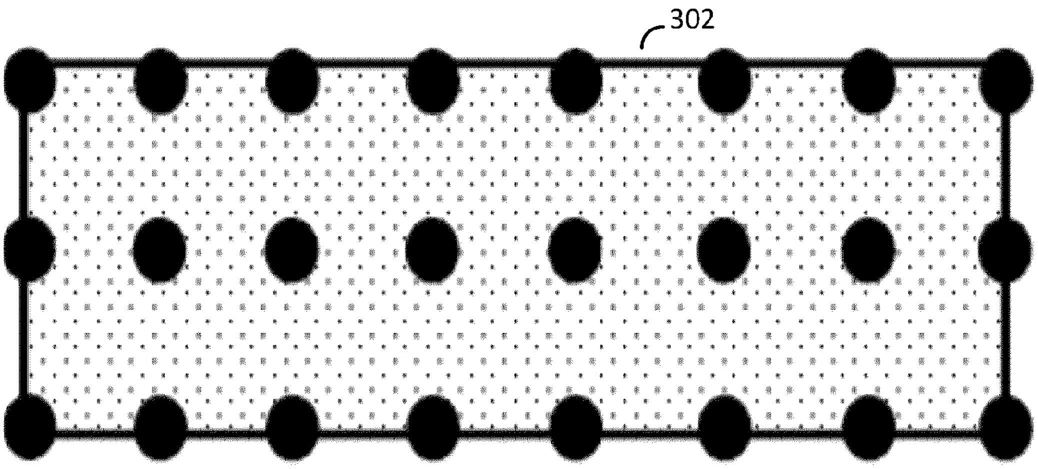
FIG. 3. illustrates representing an audio element using many point sources.

One strategy to for solving the occlusion problem for an audio element having an extent (see audio element 302 of FIG. 3) is to represent the audio element 302 with a large number of point sources spread out over the extent (as shown in FIG. 3) and calculate the occlusion effect individually for each point source using one of the known methods for point sources. This strategy, however, is highly inefficient due to the large number of point sources that need to be used in order to get a good enough resolution of the occlusion effect. And even if many point sources are used so that the resolution for a static case is good enough, there would still be a stepwise behavior where the effect of the occlusion changes in discrete steps as the individual point sources are either occluded or not occluded in a dynamic scene. Another disadvantage with using many point sources to represent a heterogeneous (multi-channel) audio element is that it is not trivial how to up-mix from a few audio channels to a large number of point sources without causing spatial and/or spectral distortions in the resulting listener signals (due to the fact that neighboring point sources would be highly correlated).

Accordingly, this disclosure describes additional embodiments that do not suffer these drawbacks discussed in the preceding paragraph. In one aspect, a method according to one embodiment comprises the steps of:

1. Detecting that an audio element as seen from the listener position is occluded (e.g., fully occluded or partially occluded) by an occluding object;

2. Calculating the amount of occlusion in a set of sub-areas (a.k.a., parts) of a projection of the audio element as seen from the listener position, where the projection may be for example the projection of the extent of the audio element onto a sphere around the listener or a projection of the extent of the audio element onto a plane between the audio element and the listener. International Patent Application Publication No. WO2021180820 describes a technique for projecting an audio object with a complex shape. For example the publication describes a method for representing an audio object with respect to a listening position of a listener in an extended reality scene, where the method includes: obtaining first metadata describing a first three-dimensional (3D) shape associated with the audio object and transforming the obtained first metadata to produce transformed metadata describing a two-dimensional (2D) plane or a one-dimensional (1D) line, wherein the 2D plane or the 1D line represent at least a portion of the audio object, and transforming the obtained first metadata to produce the transformed metadata comprises: determining a set of description points, wherein the set of description points comprises an anchor point; and determining the 2D plane or ID line using the description points, wherein the 2D plane or 1D lines passes through the anchor point. The anchor point may be: i) a point on the surface of the 3D shape that is closest to the listening position of the listener in the extended reality scene, ii) a spatial average of points on or within the 3D shape, or iii) the centroid of the part of the shape that is visible to the listener; and the set of description points further comprises: a first point on the first 3D shape that represents a first edge of the first 3D shape with respect to the listening position of the listener, and a second point on the first 3D shape that represents a second edge of the first 3D shape with respect to the listening position of the listener.

3. Calculate a gain factor for the signal of each virtual loudspeaker used in rendering the audio element based on the amount of occlusion in the different parts of the extent (e.g., the gain factor for a signal of a virtual loudspeaker for a part of the audio element that is not affected by the occluding object is set to 1, whereas signals for other virtual loudspeakers for parts affected by the occluding object are set to a value less than 1); and 4. Modifying the positions of zero or more of the virtual loudspeakers in order to represent the non-occluded parts of the extent.

A. Calculating the Amount of Occlusion in Each Sub-Area

Given the knowledge of what sub-areas of the audio element (more precisely a projection of the audio element) are at least partially occluded and given knowledge about the occluding object (e.g., a parameter indicating the amount of audio energy from the audio element that passes through the occluding object), an amount of occlusion can be calculated for each said sub-area. In a scenario where the parameter indicates that no energy from the audio element passes through the occluding object, then the amount of occlusion can be calculated as the percentage of the sub-area that is occluded from the listening position.

The sub-areas of the projection of the audio element can be defined in many different ways. In one embodiment, there are as many sub-areas as there are virtual loudspeakers used for the rendering, and each sub-area corresponds to one virtual loudspeaker. In another embodiment, the sub-areas are defined independently from the number and/or positions of the virtual loudspeakers used for the rendering. The sub-areas may be equal in size. The sub-areas may be directly adjacent to each other. The sub-areas together may completely fill the surface area of the projected extent of the audio element, i.e. the total size of the projected extent is equal to the sum of the surface areas of all the sub-areas.

B. Calculating the Gain Factor

For each sub-area, a gain factor can be calculated depending on the amount of occlusion for that area. For example, in some scenarios where the occluding object is a thick, brick wall or the like, a sub-area that is completely occluded (amount is 100%) by the occluding brick wall may be completely muted and the gain factor should therefore be set to 0.0. For a sub-area where the occlusion amount is 0, the gain factor should be set to 1.0. For other amounts of occlusion, the gain factor should be somewhere in-between 0.0 and 1.0, but the exact behavior may depend on the spatial character of the audio element. In one embodiment the gain factor is calculated as:

$g=(1.0-0.01*O)$, where O is the occlusion amount in percent.

In one embodiment, O for a given sub-area is a function of a frequency dependent occlusion factor (OF) and a value P, where P is the percentage of the sub-area that is covered by the occluding object (i.e., the percentage of the sub-area that cannot be seen by the listener due to the fact that the occluding object is located between the listener and the sub-area). For example, O=OF*P, where OF=Of1 for frequencies below f1, OF=Of2 for frequencies between f1 and f2, and OF–Of3 for frequencies above f2. That is, for a given frequency, different types of occluding objects may have a different occlusion factor. For instance, for a first frequency, a brick wall may have an occlusion factor of 1, whereas a thin curtain of cotton may have an occlusion factor of 0.2, and for a second frequency, the brick wall may have an occlusion factor of 0.8, whereas a thin curtain of cotton may have an occlusion factor of 0.1.

In another embodiment, the gain factor is calculated using the assumption that the audio element is mostly diffuse in spatial information and a 50% occlusion amount should give a −3 dB reduction in audio energy from that sub-area. The gain factor can then be calculated as:

$$g=\cos(0.01*O*\pi/2), \text{ or as}$$

$$g=sqrt\ (1-0.01*O)).$$

The embodiments are not limited to the above examples as other gain functions for calculating the gain of a sub-area are possible. As exemplified by the two embodiments described above, the effect of the occlusion can be a gradual one when the audio element is partly occluded, so that the signal from a virtual loudspeaker is not necessarily completely muted whenever the virtual loudspeaker is occluded for the listener. This prevents that, for example, in the case of a stereo rendering with two virtual loudspeakers, no sound at all is received from, for example, the left half of the audio element whenever the left virtual loudspeaker is occluded. Additionally, it prevents the undesirable "step-wise" occlusion effect when the occluding object, the audio element and/or the listener are moving relative to each other."

Figure 8:
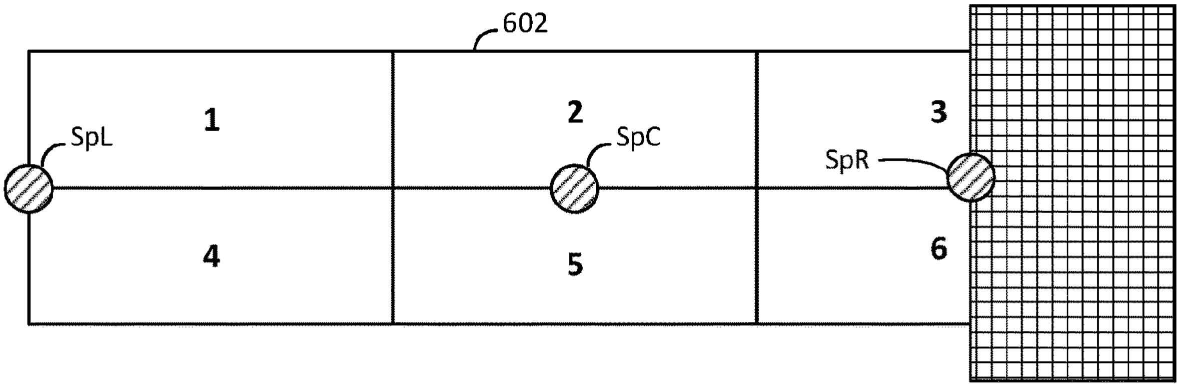
FIG. 8 illustrates an example embodiment.
Figure 9A:
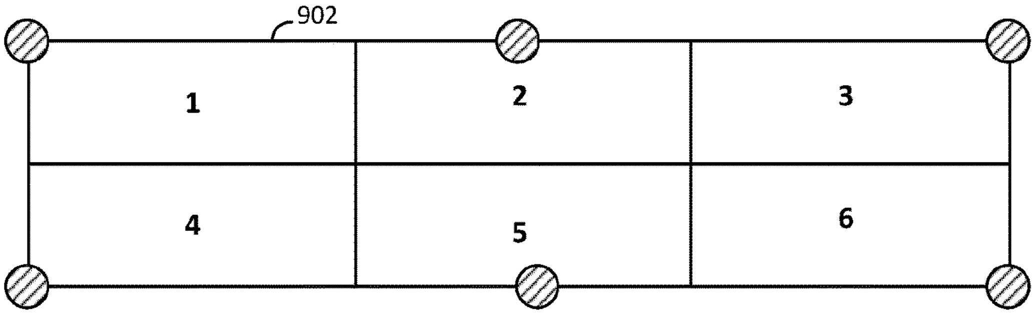
FIGS. 9A and 9B illustrate various example embodiments.
Figure 9B:
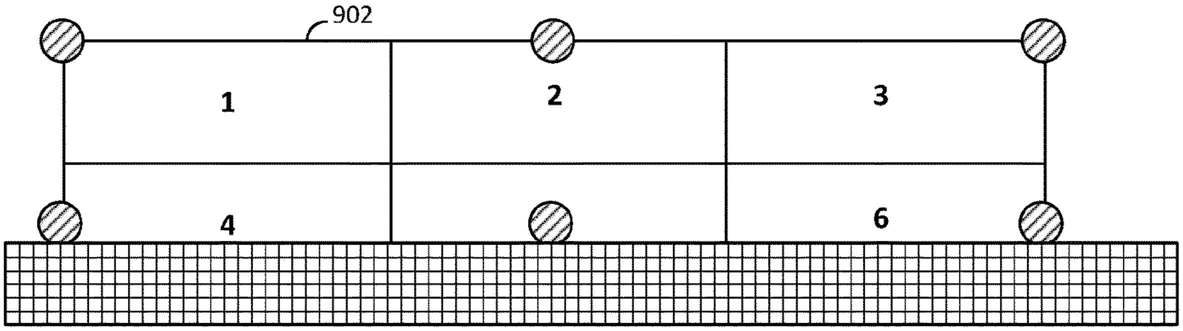

C. Modifying the Positions of the Virtual Loudspeakers Representing the Audio Element When a part of the audio element is occluded, the positions of the virtual loudspeakers representing the audio element can be moved so that they better represent the non-occluded part. If one of the edges of the extent of the audio element is occluded, the virtual loudspeaker(s) representing this edge should be move to the edge where the occlusion is happening as illustrated in FIG. 8 and FIG. 9B.

Figure 10:
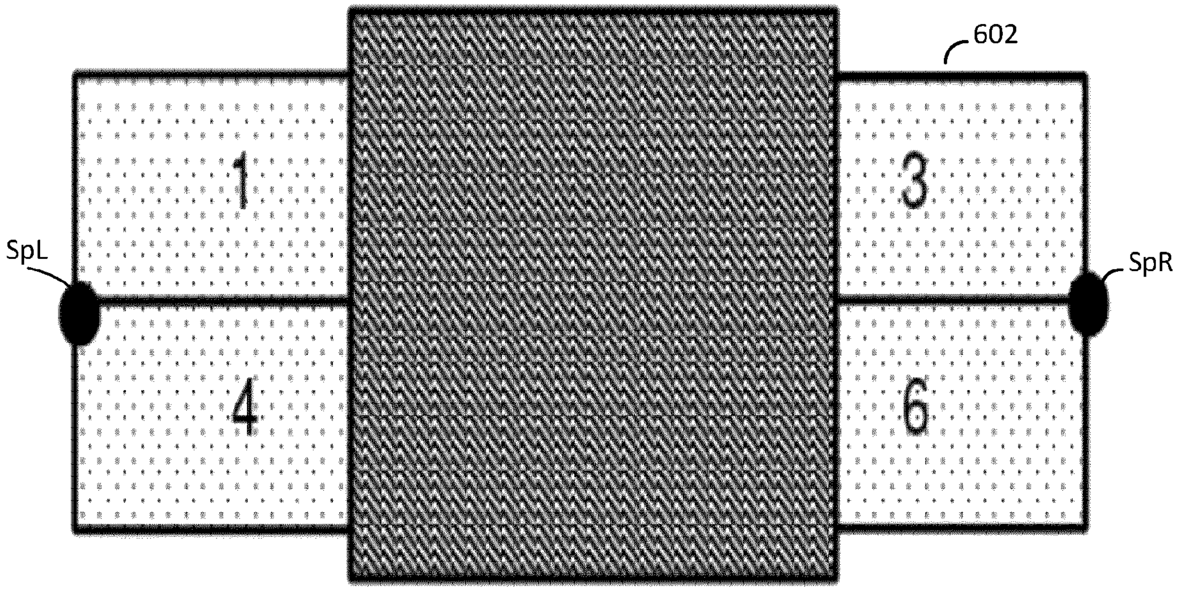
FIG. 10 illustrates an example embodiment.

In the case where an occluding object is covering the middle of the audio element, as shown in FIG. 10, the speaker positions are kept intact and the effect of the occlusion is only represented by the gain factors of the signals going to the respective virtual loudspeaker.

In the case that the audio element is only represented by virtual loudspeakers in the horizontal plane, an occlusion that covers either the bottom or top part can be rendered by changing the vertical position of the virtual loudspeakers so that their vertical position corresponds to the middle of the non-occluded part of the extent.

In another embodiment, the vertical position of each virtual loudspeaker is controlled by the ratio of occlusion amount in the upper sub-area and the lower sub-area. An example of how this position can be calculated is given by:

$$P_y = O_U/O_L * P_{YT} + (1 - O_U/O_L) * P_{YB},$$

where $P_Y$ is the vertical coordinate of the loudspeaker, $O_U$ and $O_L$ are the occlusion amount of the upper part and the lower part of the extent. $P_{YT}$ and $P_{YB}$ are the vertical coordinate of the top and bottom edges of the extent.

Figure 4A:
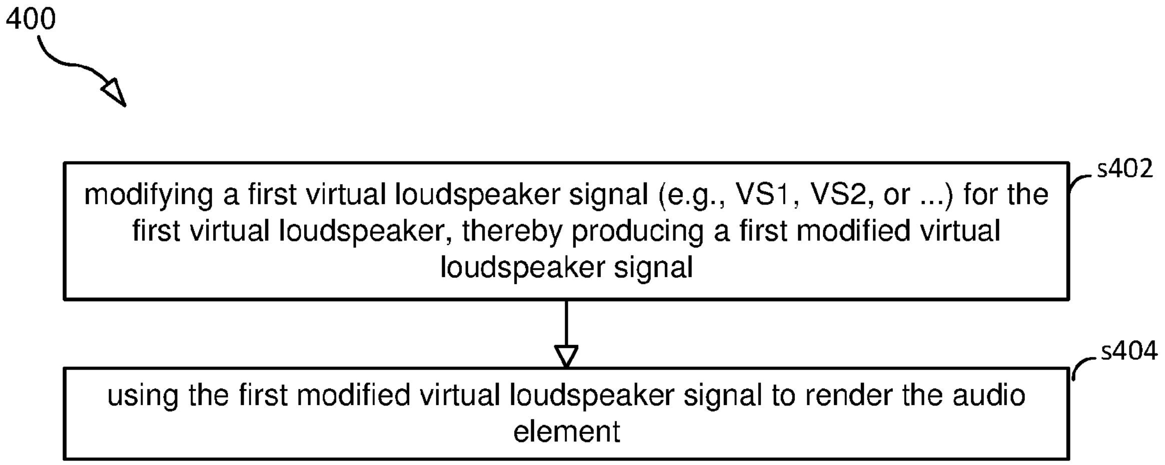
FIG. 4A is a flowchart illustrating a process according to an embodiment.

FIG. 4A is a flowchart illustrating a process 400, according to an embodiment, for rendering an at least partially occluded audio element represented using a set of two or more virtual loudspeakers, the set comprising a first virtual loudspeaker. Process 400 may begin in step s402. Step s402 comprises modifying a first virtual loudspeaker signal for the first virtual loudspeaker, thereby producing a first modified virtual loudspeaker signal. Step s404 comprises using the first modified virtual loudspeaker signal to render the audio element (e.g., generate an output signal using the first modified virtual loudspeaker signal).

In some embodiments, the process further includes obtaining information indicating that the audio element is at least partially occluded, wherein the modifying is performed as a result of obtaining the information.

In some embodiments, the process further includes detecting that the audio element is at least partially occluded, wherein the modifying is performed as a result of the detection.

In some embodiments, modifying the first virtual loudspeaker signal comprises adjusting the gain of the first virtual loudspeaker signal.

In some embodiments, the process further includes moving the first virtual loudspeaker from an initial position (e.g., default position) to a new position and then generating the first virtual loudspeaker signal using information indicating the new position.

In some embodiments, the process further includes determining an occlusion amount (O) associated with the first virtual loudspeaker and the step of modifying the first virtual loudspeaker signal for the first virtual loudspeaker comprises modifying the first virtual loudspeaker signal based on O. In some embodiments, modifying the first virtual loudspeaker signal based on O comprises modifying the first virtual loudspeaker signal VS1 such that the modified loudspeaker signal equals (g*VS1), where g is a gain factor that is calculated using O and VS1 is the first virtual loudspeaker signal. In one embodiment, g=1−0.01*O or g=sqrt(1−0.01*O). In one embodiment determining O comprises obtaining a particular occlusion factor (Of) for the occluding object and determining a percentage of a sub-area of a projection of the audio element that is covered by the occluding object, where the first virtual loudspeaker is associated with the sub-area.

Figure 4B:
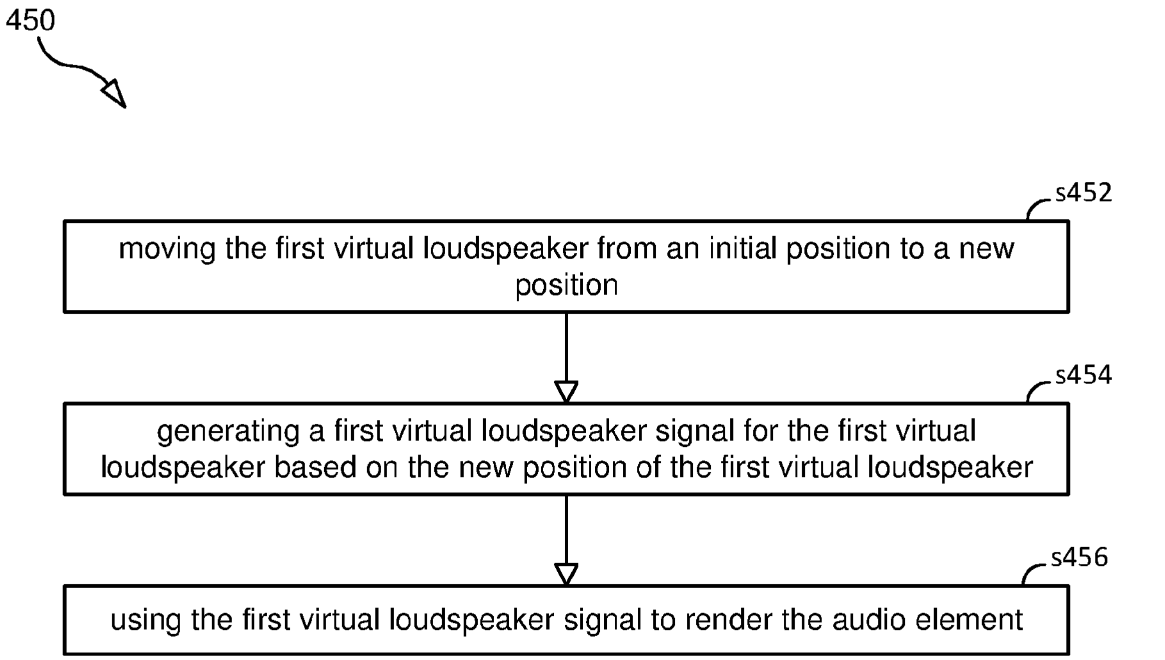
FIG. 4B is a flowchart illustrating a process according to an embodiment.

FIG. 4B is a flowchart illustrating a process 450, according to an embodiment, for rendering an at least partially occluded audio element represented using a set of two or more virtual loudspeakers, the set comprising a first virtual loudspeaker. Process 450 may begin in step s452. Step s452 comprises moving the first virtual loudspeaker from an initial position to a new position. Step s454 comprises generating a first virtual loudspeaker signal for the first virtual loudspeaker based on the new position of the first virtual loudspeaker. Step s456 comprises using the first virtual loudspeaker signal to render the audio element. In some embodiments, the process further includes obtaining information indicating that the audio element is at least partially occluded, wherein the moving is performed as a result of obtaining the information. In some embodiments, the process further includes detecting that the audio element is at least partially occluded, wherein the moving is performed as a result of the detection.

Figure 5:
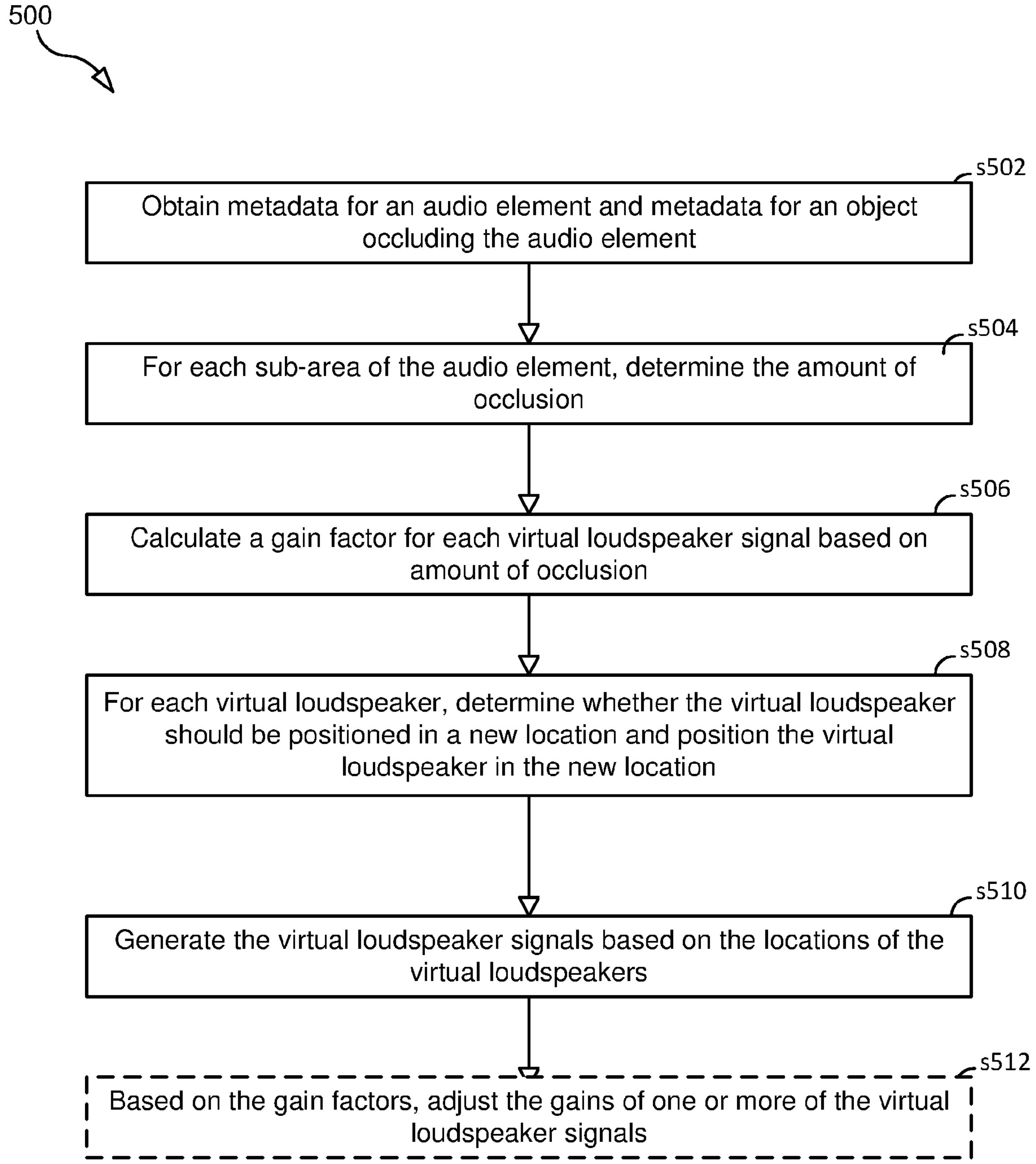
FIG. 5. is a flowchart illustrating a process according to an embodiment.

FIG. 5 is a flowchart illustrating a process 500, according to an embodiment, for rendering an occluded audio element. Process 500 may begin in step s502. Step s502 comprises obtaining metadata for an audio element and metadata for an object occluding the audio element (the metadata for the occluding object may include information specifying the occlusion factors for the object at different frequencies). Step s504 comprises, for each sub-area of the audio element, determining the amount of occlusion. Step s506 comprises calculating a gain factor for each virtual loudspeaker signal based on the amount of occlusion. Step s508 comprises, for each virtual loudspeaker, determining whether the virtual loudspeaker should be positioned in a new location and position the virtual loudspeaker in the new location. Step s510 comprises generating the virtual loudspeaker signals based on the locations of the virtual speakers. Step s512 comprises, based on the gain factors, adjusting the gains of one or more of the virtual loudspeaker signals.

Figure 6A:
FIGS. 6A, 6B, 6C illustrate various example embodiments.

FIG. 6A is an example of where audio element 602 (or, more precisely, the projection of the audio element 602 as seen from the listener position) is logically divided into six parts (a.k.a., six sub-areas), where parts 1 & 4 represents the left area of the audio element 602, parts 3 & 6 represents the right area, and parts 2 & 5 represents the center. Also, parts 1, 2 & 3 together represent the upper area of the audio element and parts 4, 5 & 6 represent the lower area of the audio element.

Figure 6B:
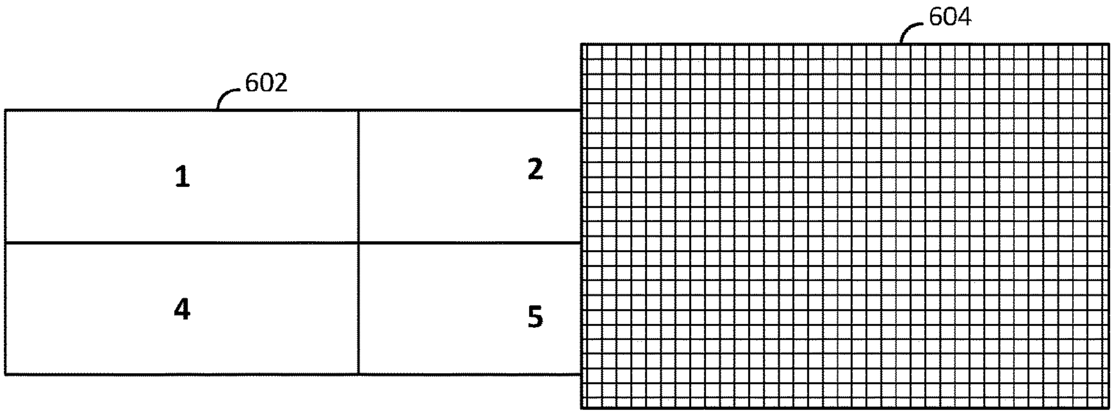

FIG. 6B shows an example scenario where audio element 602 as seen by the listener is partially occluded by an occluding object 604, which, in this example and the other examples, has an occlusion factor of 1. By calculating how much of each part of audio element 602 is covered by occluding object 604, the relative gain balance of the left, center and right parts can be calculated. Likewise, a relative gain balance of the upper area as compared to the lower area can be calculated. In the example shown in FIG. 6B, the right area of the audio element should be completely muted as it is completely covered by object 604, the center area should have slightly lower gain and the left area is unaffected. There is no difference in occlusion of the upper area as compared to the lower area.

Figure 6C:
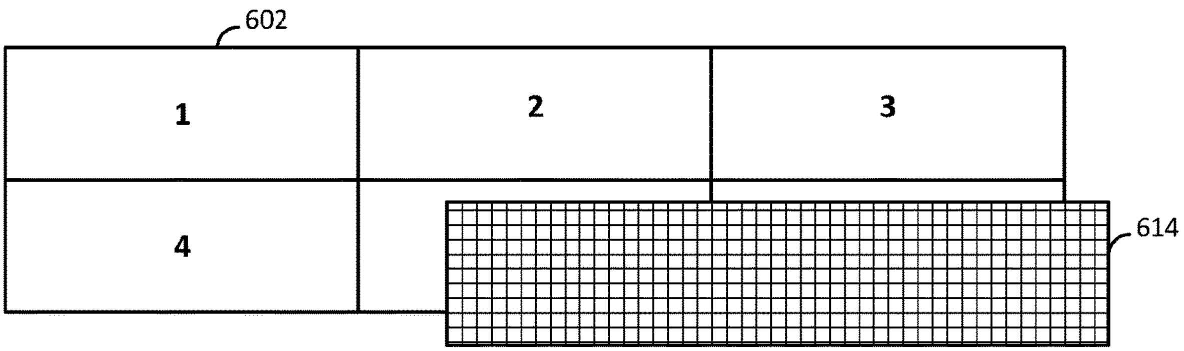

FIG. 6C shows an example scenario where audio element 602 is partially occluded by an occluding object 614. In this example, the center and right area should be partly muted. The lower part should be more muted than the upper part.

Figure 7A:
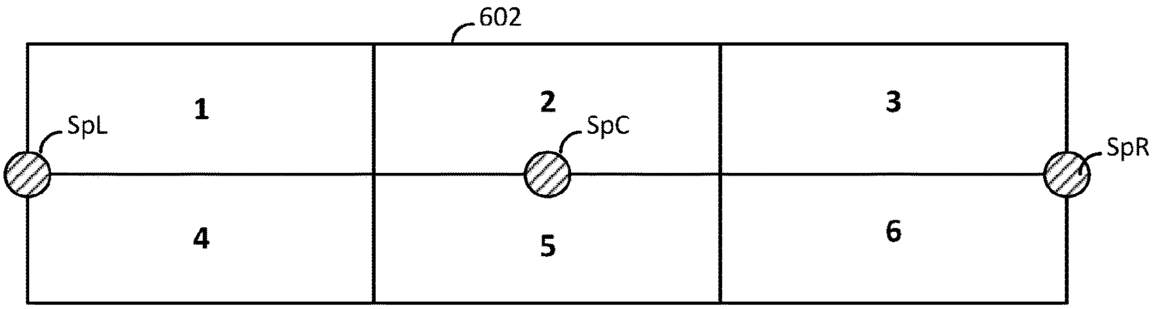
FIGS. 7A, 7B, 7C illustrate various example embodiments.
Figure 7B:
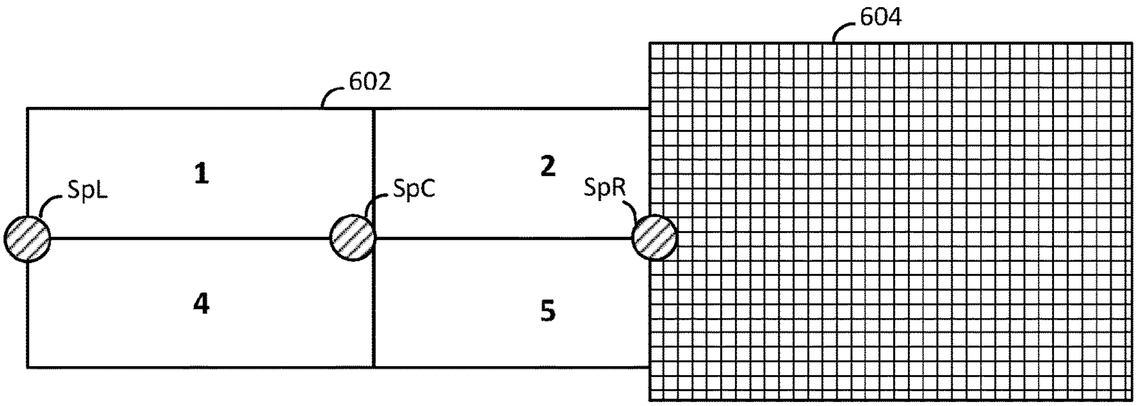
Figure 7C:
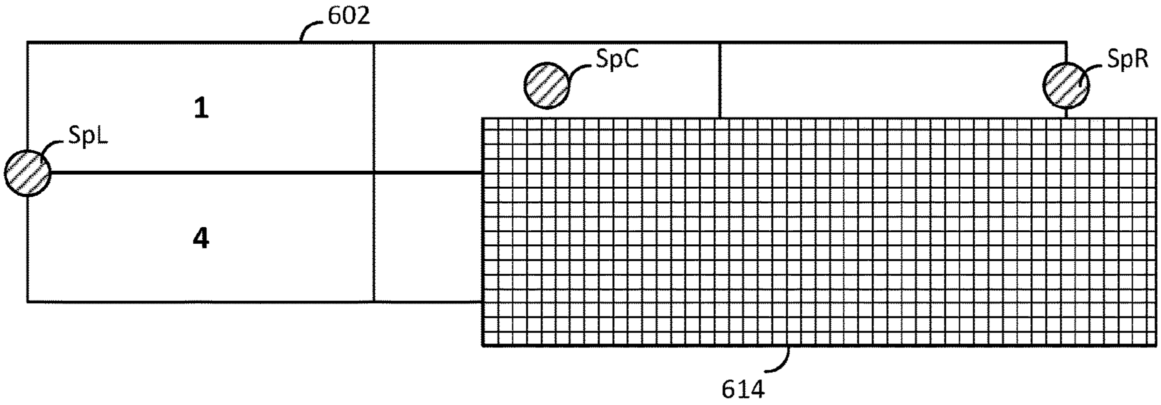

FIG. 7A shows an example where audio element 602 is represented by three virtual loudspeakers, SpL, SpC, SpR. FIG. 7B shows how the positions of the virtual loudspeakers are modified to reflect the occlusion of audio element 602 by object 604. The speaker SpR, representing the right edge of the extent, is moved to the edge where the occlusion is happening. Speaker SpC is moved to the center of the part that is not occluded. FIG. 7C shows how the positions of the virtual loudspeakers are modified to reflect the occlusion of audio element 602 by object 614. The speaker SpR, representing the right edge of the extent, is moved upward to a new position and speaker SpC is also moved upward.

FIG. 8 shows an example where the right sub-areas of audio element 602 are partly occluded. In this case the virtual loudspeaker representing the right edge is moved so that it lines up with the edge where the occlusion happens. The center speaker may be moved to the position representing the center of the non-occluded part of the audio element FIG. 9 shows an example of an audio element 902 that is represented by six virtual loudspeakers, where the lower part of the audio element is occluded. In this case the virtual loudspeakers representing the bottom edge are moved so that they line up with the edge where the occlusion happens.

FIG. 10 shows an example where the middle of the audio element 602 is occluded. In this case the positions of the loudspeakers are kept as they are since neither the left or the right edges are occluded and need to be represented. The occlusion in this case is only affecting the gain of the signals to each speaker. In this case the middle speaker would be completely muted (i.e., gain factor=0) and the gain to the left and right speakers slightly lowered to reflect that also sub-areas 1,4,3 and 6 are partly occluded.

Figure 11:
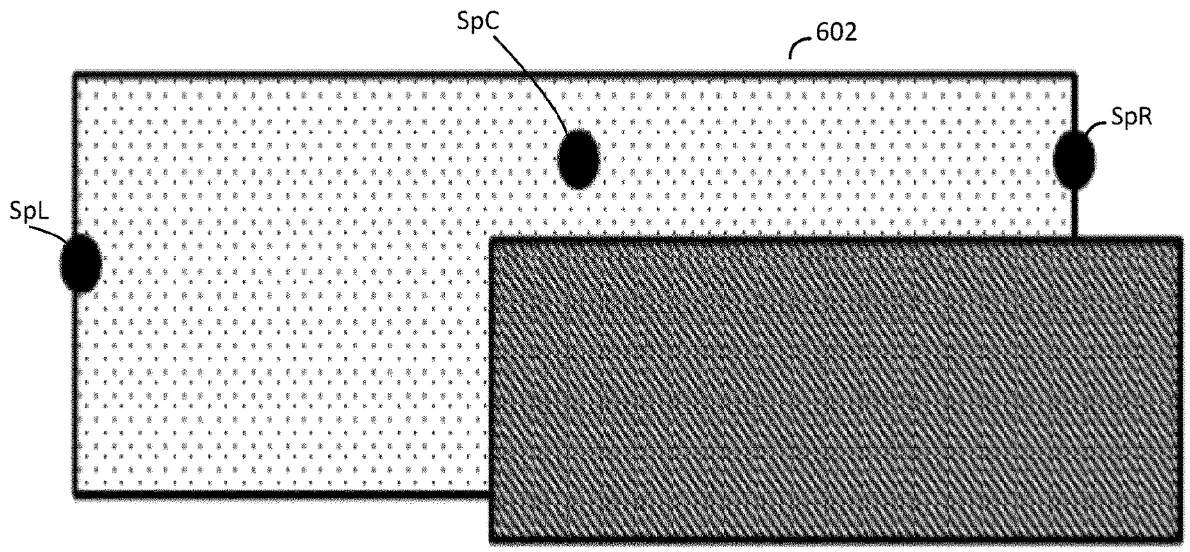
FIG. 11 illustrates an example embodiment.

FIG. 11 shows an example where the center and right areas of audio element 602 are partly occluded. The positions of the virtual loudspeakers are modified in elevation so that the greater amount of occlusion of these lower parts is reflected. The gain of the signals should also be lowered in order to reflect that the center and right areas are partly occluded.

Example Use Case

Figure 12A:
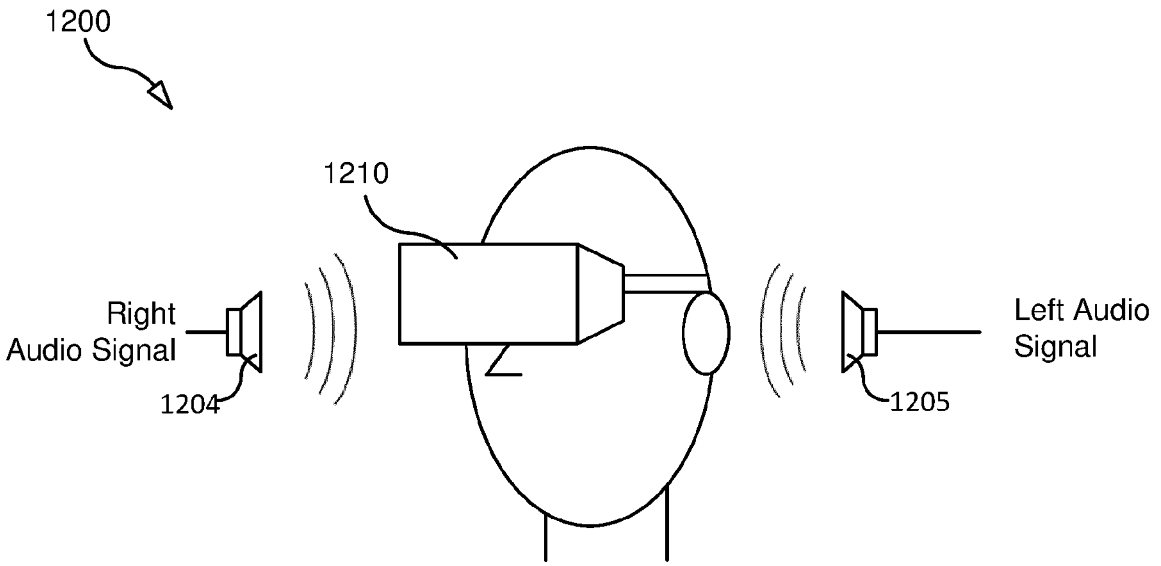
FIGS. 12A and 12B show a system according to some embodiments.
Figure 12B:
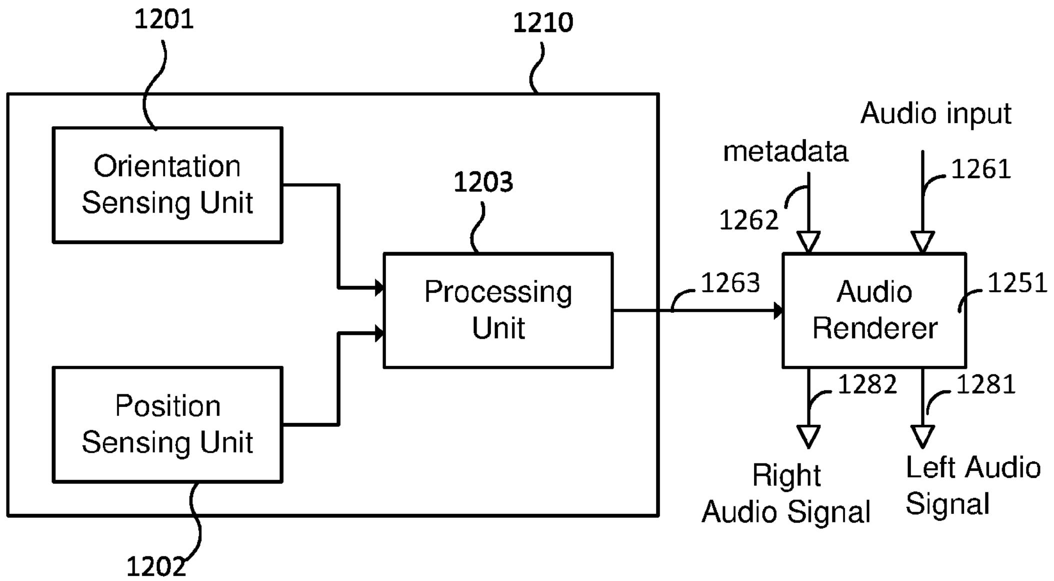

FIG. 12A illustrates an XR system 1200 in which the embodiments may be applied. XR system 1200 includes speakers 1204 and 1205 (which may be speakers of headphones worn by the listener) and a display device 1210 that is configured to be worn by the listener. As shown in FIG. 12B, XR system 1210 may comprise an orientation sensing unit 1201, a position sensing unit 1202, and a processing unit 1203 coupled (directly or indirectly) to an audio render 1251 for producing output audio signals (e.g., a left audio signal 1281 for a left speaker and a right audio signal 1282 for a right speaker as shown). Audio renderer 1251 produces the output signals based on input audio signals, metadata regarding the XR scene the listener is experiencing, and information about the location and orientation of the listener. The metadata for the XR scene may include metadata for each object and audio element included in the XR scene, and the metadata for an object may include information about the dimensions of the object and the occlusion factors for the object (e.g., the metadata may specify a set of occlusion factors where each occlusion factor is applicable for a different frequency or frequency range). Audio renderer 1251 may be a component of display device 1210 or it may be remote from the listener (e.g., renderer 1251 may be implemented in the "cloud").

Orientation sensing unit 1201 is configured to detect a change in the orientation of the listener and provides information regarding the detected change to processing unit 1203. In some embodiments, processing unit 1203 determines the absolute orientation (in relation to some coordinate system) given the detected change in orientation detected by orientation sensing unit 1201. There could also be different systems for determination of orientation and position, e.g. a system using lighthouse trackers (lidar). In one embodiment, orientation sensing unit 1201 may determine the absolute orientation (in relation to some coordinate system) given the detected change in orientation. In this case the processing unit 1203 may simply multiplex the absolute orientation data from orientation sensing unit 1201 and positional data from position sensing unit 1202. In some embodiments, orientation sensing unit 1201 may comprise one or more accelerometers and/or one or more gyroscopes.

Figure 13:
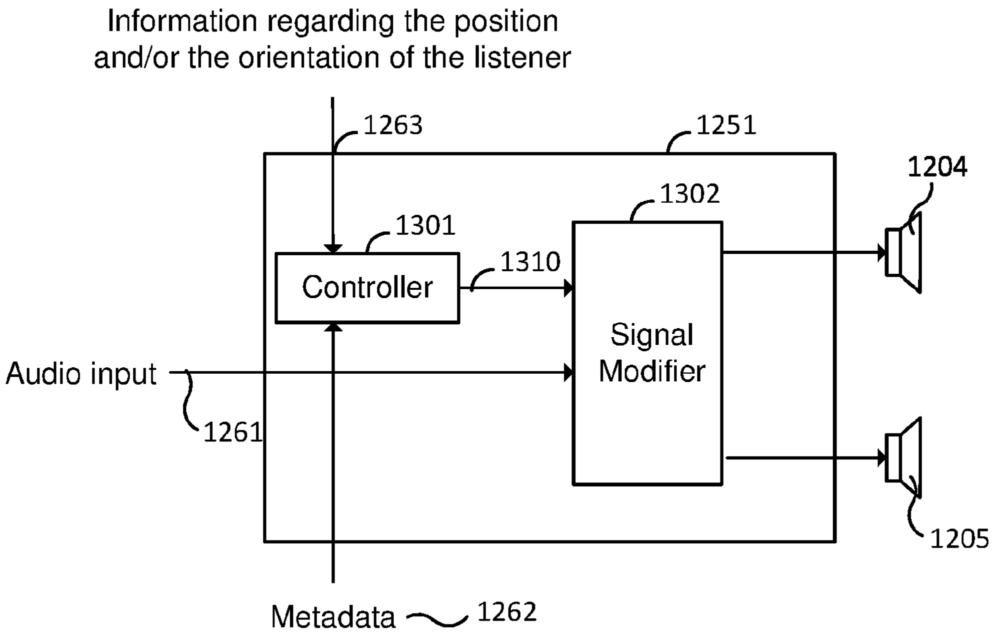
FIG. 13 illustrates a system according to some embodiments.

FIG. 13 shows an example implementation of audio renderer 1251 for producing sound for the XR scene. Audio renderer 1251 includes a controller 1301 and a signal modifier 1302 for modifying audio signal(s) 1261 (e.g., the audio signals of a multi-channel audio element) based on control information 1310 from controller 1301. Controller 1301 may be configured to receive one or more parameters and to trigger modifier 1302 to perform modifications on audio signals 1261 based on the received parameters (e.g., increasing or decreasing the volume level). The received parameters include information 1263 regarding the position and/or orientation of the listener (e.g., direction and distance to an audio element), metadata 1262 regarding an audio element in the XR scene (e.g., audio element 602), and metadata regarding an object occluding the audio element (e.g., object 154) (in some embodiments, controller 1301 itself produces the metadata 1262). Using the metadata and position/orientation information, controller 1301 may calculate one more gain factors (g) for an audio element in the XR scene that is at least partially occluded as described above.

Figure 14:
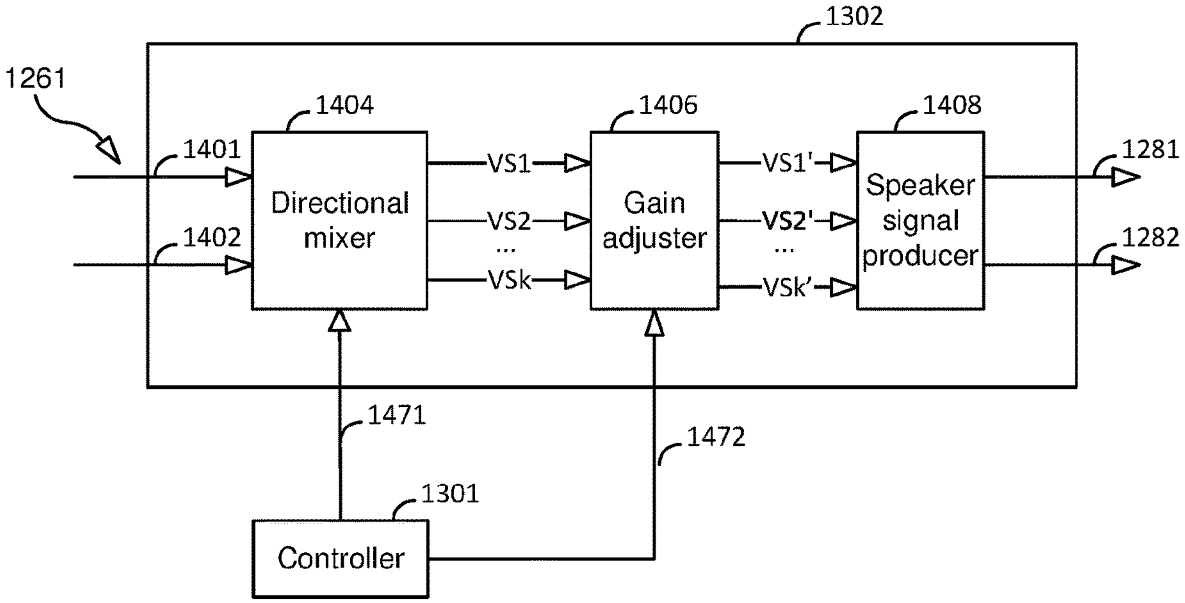
FIG. 14. illustrates a signal modifier according to an embodiment.

FIG. 14 shows an example implementation of signal modifier 1302 according to one embodiment. Signal modifier 1302 includes a directional mixer 1404, a gain adjuster 1406, and a speaker signal producer 1408.

Directional mixer 1404 receives audio input 1261, which in this example includes a pair of audio signals 1401 and 1402 associated with an audio element (e.g. audio element 602), and produces a set of k virtual loudspeaker signals (VS1, VS2, . . . , VSk) based on the audio input and control information 1471. In one embodiment, the signal for each virtual loudspeaker can be derived by, for example, the appropriate mixing of the signals that comprise the audio input 1261. For example: $VS1=\alpha\times L+\beta\times R$, where L is input audio signal 1401, R is input audio signal 1402, and $\alpha$ and $\beta$ are factors that are dependent on, for example, the position of the listener relative to the audio element and the position of the virtual loudspeaker to which VS1 corresponds.

In the example where audio element 602 is associated with three virtual loudspeakers (SpL, SpC, and SpR), then k will equal 3 for the audio element and VS1 may correspond to SpL, VS2 may correspond to SpC, and VS3 may correspond to SpR. The control information 1471 used by directional mixer to produce the virtual loudspeaker signals may include the positions of each virtual loudspeaker relative to the audio element. In some embodiments, controller 1301 is configured such that, when the audio element is occluded, controller 1301 may adjust the position of one or more of the virtual loudspeakers associated with the audio element and provide the position information to directional mixer 1404 which then uses the updated position information to produce the signals for the virtual loudspeakers (i.e., VS1, VS2, . . . , VSk).

Gain adjuster 1406 may adjust the gain of any one or more of the virtual loudspeaker signals based on control information 1472, which may include the above described gain factors as calculated by controller 1301. That is, for example, when the audio element is at least partially occluded, controller 1301 may control gain adjuster 1406 to adjust the gain of one or more of the virtual loudspeaker signals by providing one or more gain factors to gain adjuster 1406. For instance, if the entire left portion of the audio element is occluded, then controller 1301 may provide to gain adjuster 1406 control information 1472 that causes gain adjuster 1406 to reduce the gain of VS1 by 100% (i.e., gain factor=0 so that VS1'=0). As another example, if only 50% of the left portion of the audio element is occluded and 0% of the center portion is occluded, then controller 1301 may provide to gain adjuster 1406 control information 1472 that causes gain adjuster 1406 to reduce the gain of VS1 by 50% (i.e., VS1'=50% VS1) and to not reduce the gain of VS2 at all (i.e., gain factor=1 so that VS2'=VS2).

Using virtual loudspeaker signals VS1', VS2', . . . , VSk', speaker signal producer 1408 produces output signals (e.g., output signal 1281 and output signal 1282) for driving speakers (e.g., headphone speakers or other speakers). In one embodiment where the speakers are headphone speakers, speaker signal producer 1408 may perform conventional binaural rendering to produce the output signals. In embodiments where the speakers are not headphone speakers, speaker signal producer 1408 may perform conventional speaking panning to produce the output signals.

Figure 15:
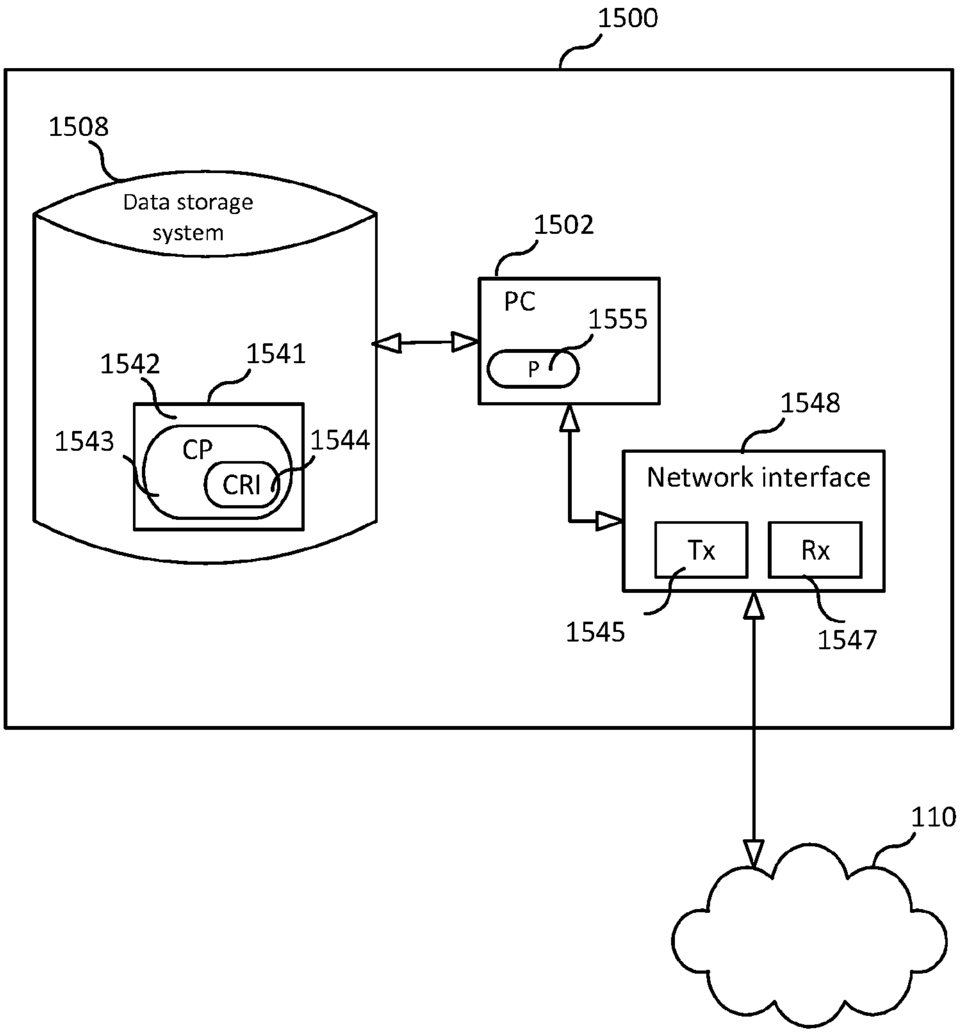
FIG. 15 is a block diagram of an apparatus according to some embodiments.

FIG. 15 is a block diagram of an audio rendering apparatus 1500, according to some embodiments, for performing the methods disclosed herein (e.g., audio renderer 1251 may be implemented using audio rendering apparatus 1500). As shown in FIG. 15, audio rendering apparatus 1500 may comprise: processing circuitry (PC) 1502, which may include one or more processors (P) 1555 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed (i.e., apparatus 1500 may be a distributed computing apparatus); at least one network interface 1548 comprising a transmitter (Tx) 1545 and a receiver (Rx) 1547 for enabling apparatus 1500 to transmit data to and receive data from other nodes connected to a network 110 (e.g., an Internet Protocol (IP) network) to which network interface 1548 is connected (directly or indirectly) (e.g., network interface 1548 may be wirelessly connected to the network 110, in which case network interface 1548 is connected to an antenna arrangement); and a storage unit (a.k.a., "data storage system") 1508, which may include one or more non-volatile storage devices and/or one or more volatile storage devices. In embodiments where PC 1502 includes a programmable processor, a computer program product (CPP) 1541 may be provided. CPP 1541 includes a computer readable medium (CRM) 1542 storing a computer program (CP) 1543 comprising computer readable instructions (CRI) 1544. CRM 1542 may be a non-transitory computer readable medium, such as, magnetic media (e.g., a hard disk), optical media, memory devices (e.g., random access memory, flash memory), and the like. In some embodiments, the CRI 1544 of computer program 1543 is configured such that when executed by PC 1502, the CRI causes audio rendering apparatus 1500 to perform steps described herein (e.g., steps described herein with reference to the flow charts). In other embodiments, audio rendering apparatus 1500 may be configured to perform steps described herein without the need for code. That is, for example, PC 1502 may consist merely of one or more ASICs. Hence, the features of the embodiments described herein may be implemented in hardware and/or software.

Summary of Various Embodiments

A1. A method for rendering an at least partially occluded audio element (602, 902) represented using a set of two or more virtual loudspeakers (e.g., SpL and SpR), the set comprising a first virtual loudspeaker (e.g., any one of SpL, SpC, SpR), the method comprising: modifying a first virtual loudspeaker signal (e.g., VS1, VS2, or . . . ) for the first virtual loudspeaker, thereby producing a first modified virtual loudspeaker signal, and using the first modified virtual loudspeaker signal to render the audio element (e.g., generate an output signal using the first modified virtual loudspeaker signal).

A2. The method of embodiment A1, further comprising obtaining information indicating that the audio element is at least partially occluded, wherein the modifying is performed as a result of obtaining the information.

A3. The method of embodiment A1 or A2, further comprising detecting that the audio element is at least partially occluded, wherein the modifying is performed as a result of the detection.

A4. The method of any one of embodiments A1-A3, wherein modifying the first virtual loudspeaker signal comprises adjusting the gain of the first virtual loudspeaker signal.

A5. The method of any one of embodiments A1-A4, further comprising moving the first virtual loudspeaker from an initial position (e.g., default position) to a new position and then generating the first virtual loudspeaker signal using information indicating the new position.

A6. The method of any one of embodiments A1-A5, further comprising determining a first occlusion amount (OA1), wherein the step of modifying the first virtual loudspeaker signal for the first virtual loudspeaker comprises modifying the first virtual loudspeaker signal based on OA1.

A7. The method of embodiment A6, wherein modifying the first virtual loudspeaker signal based on OA1 comprises modifying the first virtual loudspeaker signal such that the modified loudspeaker signal is equal to: g1*VS1, where g1 is a gain factor that is calculated using OA1 and VS1 is the first virtual loudspeaker signal.

A8. The method of embodiment A7, wherein g1 if is a function of OA1 (e.g., g1=(1−(0.01*OA1)) or g1=sqrt(1−0.01*OA1)).

A9. The method of embodiment A6, A7, or A8, wherein the audio element is at least partially occluded by an occluding object, and determining OA1 comprises obtaining an occlusion factor for the occluding object and determining a percentage of a first sub-area of a projection of the audio element that is covered by the occluding object, where the first virtual loudspeaker is associated with the first sub-area.

A10. The method of embodiment A9, wherein obtaining the occlusion factor comprises selecting the occlusion factor from a set of occlusion factors, wherein the selection is based on a frequency associated with the audio element. For example, each occlusion factor (OF) included in the set of occlusion factors is associated with a different frequency range, and the selection is based on a frequency associated with the audio element such that the selected OF is associated with a frequency range that encompasses the frequency associated with the audio element.

A11. The method of embodiment A9 or A10, wherein determining OA1 comprises calculating: OA1=Of1*P, where Of1 is the occlusion factor and P is the percentage.

A12. The method of any one of embodiments A1-A11, further comprising: modifying a second virtual loudspeaker signal for the second virtual loudspeaker, thereby producing a second modified virtual loudspeaker signal, and using the first and second modified virtual loudspeaker signals to render the audio element.

A13. The method of embodiment A12, further comprising determining a second occlusion amount (OA2) associated with the second virtual loudspeaker, wherein the step of modifying the second virtual loudspeaker signal comprises modifying the second virtual loudspeaker signal based on OA2.

A14. The method of embodiment A13, wherein modifying the second virtual loudspeaker signal based on OA2 comprises modifying the second virtual loudspeaker signal such that the second modified loudspeaker signal is equal to: g2*VS2, where g2 is a gain factor that is calculated using OA2 and VS2 is the second virtual loudspeaker signal.

A15. The method of embodiment A13 or A14, wherein determining OA2 comprises determining a percentage of a second sub-area of the projection of the audio element that is covered by the occluding object, where the second virtual loudspeaker is associated with the second sub-area.

B1. A method for rendering an at least partially occluded audio element (602, 902) represented using a set of two or more virtual loudspeakers, the set comprising a first virtual loudspeaker and a second virtual loudspeaker, the method comprising: moving the first virtual loudspeaker from an initial position to a new position, generating a first virtual loudspeaker signal for the first virtual loudspeaker based on the new position of the first virtual loudspeaker, and using the first virtual loudspeaker signal to render the audio element.

B2. The method of embodiment B1, further comprising obtaining information indicating that the audio element is at least partially occluded, wherein the moving is performed as a result of obtaining the information.

B3. The method of embodiment B1 or B2, further comprising detecting that the audio element is at least partially occluded, wherein the moving is performed as a result of the detection.

C1. A computer program comprising instructions which when executed by processing circuitry of an audio renderer causes the audio renderer to perform the method of any one of the above embodiments.

C2. A carrier containing the computer program wherein the carrier is one of an electronic signal, an optical signal, a radio signal, and a computer readable storage medium.

D1. An audio rendering apparatus that is configured to perform the method of any one of the above embodiments.

D2. The audio rendering apparatus of embodiment D1, wherein the audio rendering apparatus comprises memory and processing circuitry coupled to the memory.

While various embodiments are described herein, it should be understood that they have been presented by way of example only, and not limitation. Thus, the breadth and scope of this disclosure should not be limited by any of the above described exemplary embodiments. Moreover, any combination of the above-described objects in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

References

[1] MPEG-H 3D Audio, Clause 8.4.4.7: "Spreading"

[2] MPEG-H 3D Audio, Clause 18.1: "Element Metadata Preprocessing"

[3] MPEG-H 3D Audio, Clause 18.11: "Diffuseness Rendering"

[4] EBU ADM Renderer Tech 3388, Clause 7.3.6: "Divergence"

[5] EBU ADM Renderer Tech 3388, Clause 7.4: "Decorrelation Filters"

[6] EBU ADM Renderer Tech 3388, Clause 7.3.7: "Extent Panner"

[7] Efficient HRTF-based Spatial Audio for Area and Volumetric Sources", IEEE Transactions on Visualization and Computer Graphics 22(4):1-1 January 2016

[8] Patent Publication WO2020144062, "Efficient spatially-heterogeneous audio elements for Virtual Reality."

The invention claimed is:

1. A method for rendering an at least partially occluded audio element having an extent, wherein a projection of the audio element includes at least i) a first sub-area associated with at least a first virtual loudspeaker and ii) a second sub-area associated with at least a second virtual loudspeaker, the method comprising:

determining that at least the first sub-area of the projection of the audio element is at least partially occluded;

determining a first occlusion amount (O1) for the first sub-area;

using the first occlusion amount (O1) for the first sub-area, calculating a first gain factor (g1) for the first sub-area;

using the first gain factor (g1) and a first virtual loudspeaker signal for the first virtual loudspeaker to produce a first modified virtual loudspeaker signal for the first virtual loudspeaker; and rendering the audio element using at least:

i) the first modified virtual loudspeaker signal for the first virtual loudspeaker; and ii) a second virtual loudspeaker signal for the second virtual loudspeaker or a second modified virtual loudspeaker signal for the second virtual loudspeaker.

2. The method of claim 1, further comprising moving the first virtual loudspeaker from an initial position to a new position and then generating the first virtual loudspeaker signal using information indicating the new position.

3. The method of claim 1, wherein using the first gain factor (g1) and the first virtual loudspeaker signal for the first virtual loudspeaker to produce the first modified virtual loudspeaker signal for the first virtual loudspeaker comprises modifying the first virtual loudspeaker signal such that the first modified loudspeaker signal is equal to: g1*VS1, where g1 is the first gain factor that is calculated using the first occlusion amount (O1) and VS1 is the first virtual loudspeaker signal.

4. The method of claim 3, wherein $$g1=(1-0.01*O1)\text{ or}$$
$$g1=sqrt\ (1-0.01*O1).$$

5. The method of claim 1, wherein determining the first occlusion amount (O1) for the first sub-area comprises obtaining an occlusion factor for the occluding object and determining a percentage of a first sub-area of the projection of the audio element that is covered by the occluding object.

6. The method of claim 5, wherein obtaining the occlusion factor comprises selecting the occlusion factor (OF) from a set of occlusion factors, wherein each OF included in the set of occlusion factors is associated with a different frequency range, and the selection is based on a frequency associated with the audio element such that the selected OF is associated with a frequency range that encompasses the frequency associated with the audio element.

7. The method of claim 5, wherein determining the occlusion amount (O1) comprises calculating O1=Of1*P, where Of1 is the occlusion factor and P is the percentage.

8. The method of claim 1, further comprising:

determining a second occlusion amount (O2) for the second sub-area;

using the second occlusion amount (O2) for the second sub-area, calculating a second gain factor (g2) for the second sub-area;

using the second gain factor (g2) and the second virtual loudspeaker signal for the second virtual loudspeaker to produce the second modified virtual loudspeaker signal for the second virtual loudspeaker; and rendering the audio element using at least:

i) the first modified virtual loudspeaker signal for the first virtual loudspeaker; and ii) the second modified virtual loudspeaker signal for the second virtual loudspeaker, wherein determining the second occlusion amount (O2) comprises determining a percentage of a second sub-area of the projection of the audio element that is covered by the occluding object.

9. A non-transitory computer readable storage medium storing a computer program comprising instructions which when executed by processing circuitry of an audio renderer apparatus causes the audio renderer apparatus to perform the method of claim 1.

10. An audio rendering apparatus for rendering an at least partially occluded audio element having an extent, wherein a projection of the audio element includes at least i) a first sub-area associated with at least a first virtual loudspeaker and ii) a second sub-area associated with at least a second virtual loudspeaker, the audio rendering apparatus comprising:

memory and processing circuitry coupled to the memory, wherein the audio rendering apparatus is configured to:

determine that at least the first sub-area of the projection of the audio element is at least partially occluded;

determine a first occlusion amount (O1) for the first sub-area;

use the first occlusion amount (1) for the first sub-area, calculating a first gain factor (g1) for the first sub-area;

use the first gain factor (g1) and a first virtual loudspeaker signal for the first virtual loudspeaker to produce a first modified virtual loudspeaker signal for the first virtual loudspeaker; and render the audio element using at least:

i) the first modified virtual loudspeaker signal for the first virtual loudspeaker; and ii) a second virtual loudspeaker signal for the second virtual loudspeaker or a second modified virtual loudspeaker signal for the second virtual loudspeaker.

11. The audio rendering apparatus of claim 10, further being configured to perform the step of moving the first virtual loudspeaker from an initial position to a new position and then generating the first virtual loudspeaker signal using information indicating the new position.

12. The audio rendering apparatus of claim 10, wherein using the first gain factor (g1) and the first virtual loudspeaker signal for the first virtual loudspeaker to produce the first modified virtual loudspeaker signal for the first virtual loudspeaker comprises modifying the first virtual loudspeaker signal such that the modified loudspeaker signal is equal to: g1*VS1, where g1 is the first gain factor that is calculated using the first occlusion amount (O1) and VS1 is the first virtual loudspeaker signal.

13. The audio rendering apparatus of claim 12, wherein $$g1=(1-0.01*O1)\text{ or}$$
$$g1=sqrt\ (1-0.01*O1).$$

14. The audio rendering apparatus of claim 10, wherein determining the first occlusion amount (O1) for the first sub-area comprises obtaining an occlusion factor for the occluding object and determining a percentage of a first sub-area of the projection of the audio element that is covered by the occluding object.

15. The audio rendering apparatus of claim 14, wherein obtaining the occlusion factor comprises selecting the occlusion factor (OF) from a set of occlusion factors, wherein each OF included in the set of occlusion factors is associated with a different frequency range, and the selection is based on a frequency associated with the audio element such that the selected OF is associated with a frequency range that encompasses the frequency associated with the audio element.

16. The audio rendering apparatus of claim 14, wherein determining the occlusion amount (O1) comprises calculating O1=Of1*P, where Of1 is the occlusion factor and P is the percentage.

17. The audio rendering apparatus of claim 10, further being configured to perform the steps of:

determining a second occlusion amount (O2) for the second sub-area;

using the second occlusion amount 02) for the second sub-area, calculating a second gain factor (g2) for the second sub-area;

using the second gain factor (g2) and the second virtual loudspeaker signal for the second virtual loudspeaker to produce the second modified virtual loudspeaker signal for the second virtual loudspeaker;

rendering the audio element using at least:

i) the first modified virtual loudspeaker signal for the first virtual loudspeaker; and ii) the second modified virtual loudspeaker signal for the second virtual loudspeaker, wherein determining the second occlusion amount (O2) comprises determining a percentage of a second sub-area of the projection of the audio element that is covered by the occluding object.

* * * * *